March 1, 1966  J. H. BEARD  3,237,500
SHEARS

Filed May 23, 1963  3 Sheets-Sheet 1

INVENTOR
JACK H. BEARD
BY
Holcombe, Wetherill & Brisebois
ATTORNEYS

March 1, 1966 J. H. BEARD 3,237,500
SHEARS
Filed May 23, 1963 3 Sheets-Sheet 2

INVENTOR
JACK H. BEARD
BY
Holcombe, Wetherill & Bonsebois
ATTORNEYS

March 1, 1966

J. H. BEARD 3,237,500

SHEARS

Filed May 23, 1963

INVENTOR
JACK H. BEARD
BY
Holcombe, Wetherill & Brisebois
ATTORNEYS

United States Patent Office 3,237,500
Patented Mar. 1, 1966

3,237,500
SHEARS
Jack Herbert Beard, Sheffield, England, assignor to Davy and United Engineering Company Limited, Sheffield, England
Filed May 23, 1963, Ser. No. 282,747
Claims priority, application Great Britain, May 24, 1962, 19,996/62
10 Claims. (Cl. 83—623)

This invention relates to shears and is particularly concerned with hydraulic shears.

Hydraulic shears are generally preferred to purely mechanical shears because of the inherent protection against overloading which they afford. Previously down-and-up cut hydraulic shears have generally had one main power cylinder and ram. The ram, normally downstroking, was attached to the top shear blade holder of the machine and the cylinder was connected by means of two substantial tie-rods to the bottom shear blade holder of the machine. In addition to the two tie rods, which were required to withstand the full power of the machine, a substantial frame was required to guide and support the moving parts. Articulated or telescopic pipes were required to convey liquid to the main power cylinder.

Shearing action was effected by allowing the top blade to descend upon the slab, conveying the main power ram with it. The main cylinder was filled at the same time with fluid from a prefilling vessel through a prefilling valve. Pressure was then introduced to the main power cylinder causing it to rise, pulling the bottom blade with it through the workpiece. With this arrangement, part of the strain energy contained in the mechanical members of the shear and in the hydraulic fluid was conveyed through the top blade to the table rollers when the energy was released consequent upon collapse of the shear load. This resulted in damage to the table rollers and provision was made for the descent of the top blade to stop at a point above the workpiece instead of allowing the top blade to fall upon the workpiece. This stopping of the top blade was either controlled manually or by a sensing probe which contacted the workpiece before the top blade.

Further, with the top blade resting upon the workpiece, the forces required to accelerate and raise the main cylinder, tie bars, bottom blade and slab were reflected through the top blade on to the table rollers. However, this disadvantage was removed by the means for stopping the top blade at a point above the workpiece, provided that these means were operated properly. Unfortunately, the previously suggested stopping means have been susceptible to failure through human, mechanical, electrical or hydraulic causes.

The invention provides a method of operating a shear having two movable blades, in which a first of the blades is moved adjacent to the workpiece to be sheared, the cylinder of a piston and cylinder assembly operatively connected to the blade is substantially sealed to trap liquid therein, the second blade is independently driven to effect the shear, and thereafter the liquid trapped in the cylinder is released to permit withdrawal of the first blade.

The invention further provides a shear comprising first and second blade holders guided for movement along parallel paths, a piston and cylinder assembly operatively connected to the first blade holder, a releasible valve for substantially sealing the cylinder of the assembly to trap liquid in the cylinder when that blade holder is adjacent the workpiece to be sheared, and power means for moving the second blade holder to effect a shear.

Because of the trapping of liquid within the top knife cylinder during cutting, little or no hydraulic load due to the release of strain energy are placed upon any table rollers or like equipment associated with the shear.

The invention will be more readily understood by way of example from the following description of an hydraulic down-and-up cut shear in accordance therewith, reference being made to the accompanying drawings in which.

Figure 1:
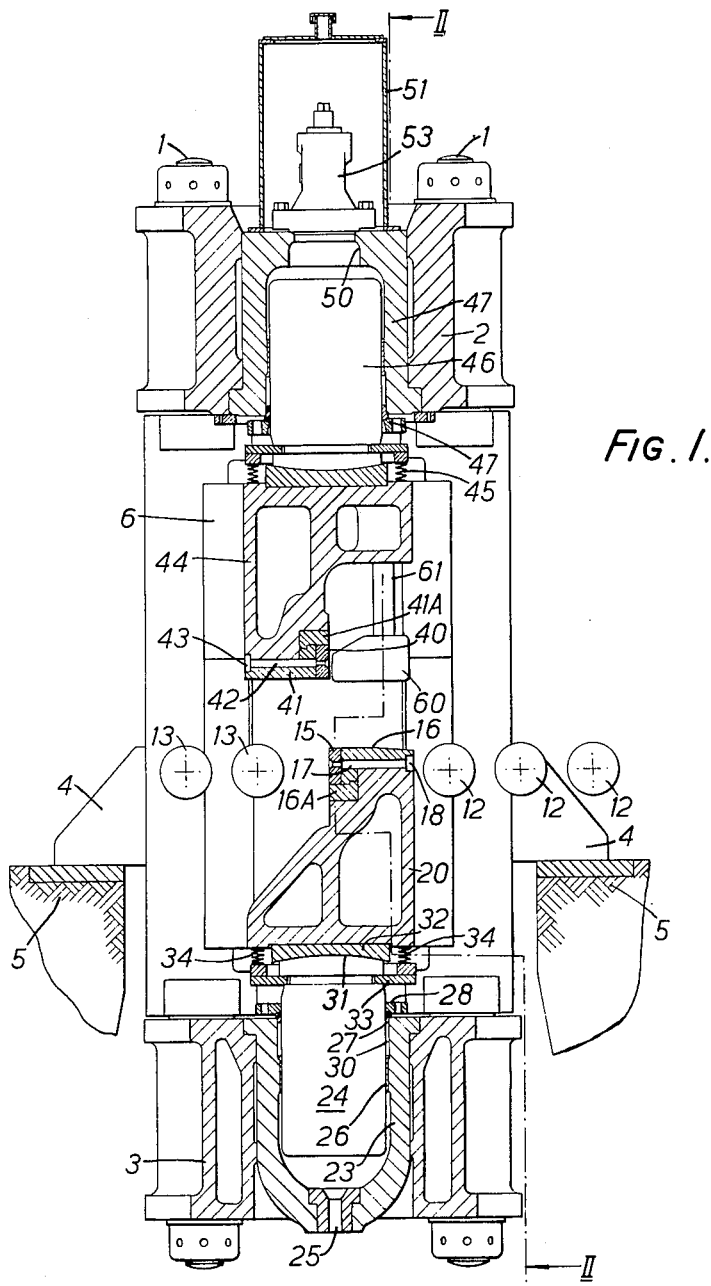
FIGURE 1 is a vertical section through the shear, on the line I—I of FIGURE 2.
Figure 2:
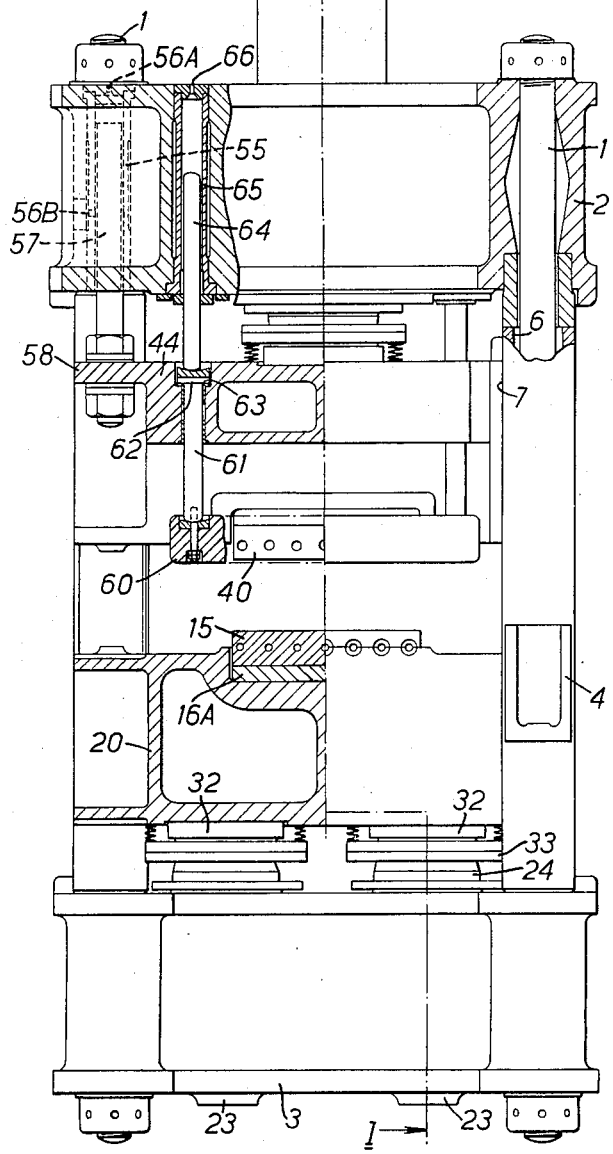
FIGURE 2 is a side view of the shear, the left-hand half of the figure being in part a section on the line II—II of FIGURE 1.

Referring to FIGURES 1 and 2, the shear has four columns 1 which are tied together by an upper fixed crosshead 2 and a lower fixed crosshead 3. Each of the columns 1 has a bracket 4 enabling the shear to be bolted down to the foundations 5, with the lower part of the shear in a well. Between the crossheads 2, 3 the columns 1 are connected by a shear frame 6 having slideways 7 for the two shear blades. Rollers 12 form part of the entry roller table and rollers 13 part of the exit roller table, by which the workpieces to be sheared and the sheared workpieces are conveyed to and from the shear.

The lower shear blade 15 of the shear is located on the lower blade seats 16, 16A by screws 17 and nuts 18, none of which project beyond the sides of the blade or its seats. The blade seats are attached to a blade holder 20 to the ends of which slide in the slideways 7 of the shear frame 6.

The lower crosshead 3 carries two similar hydraulic cylinders 23, each of which has a ram 24 and a port 25 for the supply of liquid under pressure. As the two cylinders and rams are similar, only one will be described in detail. Thus the cylinder 23 has a guide bush 26 located between it and the ram 24. A further guide bush 27 is retained at the lip of the cylinder by an annular cap 28 bolted to the end of the cylinder. There is a hydraulic seal 30 between the bushes 26, 27.

The ram 24 projects from the cylinder 23 and has a convex part-spherical end surface 31 mating with a similar, but concave, surface on a spherical seating 32. A ring 33 is located in a slot in the projecting part of ram 24 and is connected to the blade holder 20 by springs 34 which hold the blade holder on the seating 32. On supply of liquid under pressure through the port 25, the blade holder 20 and the blade 15 are driven upwardly from the rest position illustrated, in order to shear the workpiece, the seatings 32 permitting a degree of tilting of the blade holder to accommodate unequal loading.

The upper blade 40, secured in blade seats 41, 41A by screws 42 and nuts 43, lies above the roller 12, 13 and is attached to an upper blade holder 44. This blade holder is connected to the arm 46 of a single cylinder 47 carried centrally by the upper crosshead 2; the general construction of the cylinder 47 and ram 46 and the mode of connection of the ram 46 to the blade holder 44 are identical with those of the cylinder 23 and ram 24 and further description is unnecessary. The cylinder 47 is held in position in the crosshead 2 by a ring 48 bolted to the crosshead 2, and has an enlarged valve opening 50 at its upper end. The cylinder 47 also carries a tank 51 having a breather 52. Inside the tank 51 and mounted on the cylinder 47 over opening 50 is a non-return valve 53 which is shown in detail in FIGURE 3.

The upper crosshead 2 also carries on its centre line a pair of double-acting lifting and balance cylinder and rams. One of the cylinders is shown in FIGURE 2 at 55, the supply ports for the operating liquid being indicated at 56A, 56B. The ram 57 is bolted to a projecting flange 58 of the blade holder 44.

A gag 60 is situated immediately above the lower blade 15 and blade seat 16 at the approximate level of the upper blade 40. The gag 60 is carried on a pair of rods 61, one of which is shown in FIGURE 2, passing through the blade carrier 44 and carrying at their upper ends abutments 62 which seat on annular shoulders 63 formed in the blade carrier 44. The abutments 62 are normally held against their seats, so that the gag 60 moves with the upper blade carrier 44, by piston rods 64 sliding in cylinders 65 which are carried on the upper crosshead 2 and which are supplied with liquid under pressure through ports 66. Only one such cylinder 65 is shown in FIGURE 2 but it will be understood that the other is identical. As a result, the gag 60 moves with the upper blade 40 but can move upwardly relative to the blade carrier 44 and against the bias applied by the liquid in the cylinders 65 when shearing occurs.

Figure 3:
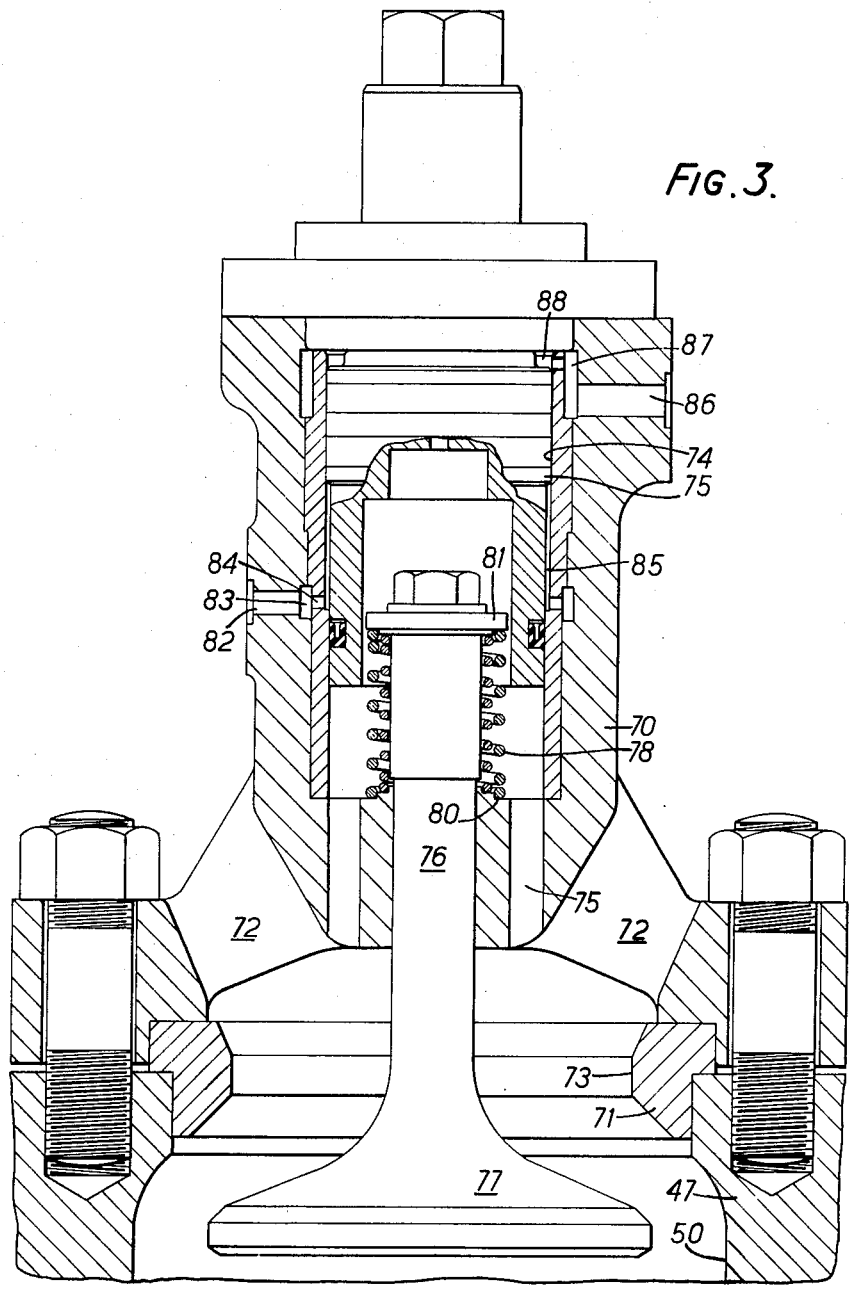
FIGURE 3 is a sectional view of the valve used in the shear.

The non-return valve, shown in detail in FIGURE 3, has a housing 70 which is bolted to the cylinder 47 and which has an annular valve seat 71 projecting into the opening 50. A series of passages 72 are formed through the housing from the valve passage 73. A cylindrical cavity 74 is formed in the housing 70 and receives a piston 75 which in turn receives the stem 76 of the valve 77. Springs 78 located between a shoulder 80 on the piston 75 and a ring 81 on the upper end of the stem 76 bias the valve 77 upwardly against its seating. The valve 77 is also biased upwardly hydraulically by the application of liquid under constant pressure through a bore 82, an annular passage 83 in the housing 70 and a series of holes 84 to an annular chamber 85 round the piston 75; the pressure of the liquid is applied to that part of piston 75 closing the chamber 85 at its upper end.

While the valve of FIGURE 3 normally acts as a non-return valve, liquid being permitted to flow through the valve downwardly, if sufficient pressure difference subsists across the valve, but being prevented from flowing upwardly, it may be controlled to open and permit upward flow. To do so, liquid under pressure is applied to a bore 86 and through the annular passage 87 and holes 88 to the cavity 74 above the head of piston 75. The downward force then applied to the piston 75 is sufficient to overcome the bias applied by the liquid in chamber 85 and cause downward movement of the piston 75 and hence of the valve 77.

In operation, the top blade 40 is caused to approach the workpiece on the rollers 12, 13 by admitting liquid under pressure to upper sides of the top blade lifting and balancing ram cylinders 55. As the top blade 40 descends and the ram 46 moves downwardly in the cylinder 47, the pressure within cylinder 47 is reduced below that in tank 51, and the valve 77 opens against the bias of springs 78 to permit the water in tank 51 to enter the cylinder and to keep cylinder 47 full. During this downward movement, the gag 60 moves with the blade 40 as above described.

When the top blade 40 reaches the slab to be cut, the pressure at the upper sides of the lifting and balancing rams 57 rises, and the pressure rise is used to initiate a signal to operate valves to raise the bottom blade and to release the pressure on the upper sides of the top blade lifting and balancing rams 57. When the descent of the top blade, and of the ram 46 is stopped in this way, the valve 77 closes under the bias of the springs 78 and the water in the cylinder 47 above the ram 46 is trapped.

Liquid enters the cylinder 23 through the port 25 and raises the bottom blade 15, a prefilling stroke being unnecessary since the "no load" stroke is only that amount which provides clearance between the roller table level and the bottom blade rest position. As the bottom blade continues upwards under load the incoming part of the slab is held down by the blade 40 due to the trapped water in the top blade cylinder 47. Thus the slab is sheared with the sheared part being held between the bottom blade 15 and the gag 60. After shearing, the valve 77 is opened by applying water under pressure to the bore 86 to force the piston 75 and valve 77 down, and the top blade raised by its lifting and balancing rams 57. The bottom blade is lowered by exhausting the bottom blade cylinder 23.

Some upward movement or lift of the top blade 40 may occur during shearing due to compression of the water in the cylinder 47. The quantity of water is, however, at a minimum with a maximum slab thickness, that is when maximum pressure is induced, and is at a maximum with a minimum slab thickness, that is when minimum pressure is induced. The extent of lift is therefore negligible whatever thickness of slab is being sheared.

During shearing, the top blade system acquires a small amount of strain energy due to the compression of the water trapped in the cylinder 47, and when the shearing load collapses, this strain energy is released by the downward movement of the piston 45 resulting from the expansion of the water. To minimise the load on the roller table due to kinetic energy of the top blade system gained during this downward movement, a small amount of liquid may be bled off from the cylinder space 47 during the shearing process by providing a small discharge port in the cylinder 47, thus raising the point at which final dissipation of strain energy in the top blade system is effected to a level clear of the slab.

While the shear has been illustrated as having two cylinders 23 and rams 24 for the lower blade carrier 20, it will be appreciated that in some circumstances it may be desirable to employ a single cylinder and ram assembly, or more than two such assemblies. Also, although the lower rams 24 has been shown as connected to the lower blade carrier 20, the lower rams and cylinder may be reversed, the cylinders being secured to the blade carrier 20, while the pistons are secured to the lower crosshead 3.

The shear has the advantage that independent rams are provided for the upper and lower blades, thereby avoiding the transmission of load from the lower blade, through the upper blade to the roller tables, due to accelerating and lifting the bottom blade without special setting of the top blade by the operator or other means on the downward movement of the top blade 40. Also no telescopic or articulated pipes for the conveyance of high pressure lquid are required and all hydraulic pipes may be rigidly mounted with no provision for movement; the only hydraulic pipes above floor level are the relatively small ones to the gag cylinders, the top cylinder filling valve and the top blade lifting and balancing cylinders.

The hydraulic medium in the top blade main cylinder may be water, thus eliminating any fire hazard, whilst the hydraulic medium in the bottom blade cylinder or cylinders (below the hot slab) may be hydraulic oil, permitting the use of low cost direct pumps.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. A shear comprising upper and lower crossheads, meanst for connecting said crossheads together to resist the shearing loads imposed thereon, independent first and second blade holders carried by said crossheads and each including a shear blade adapted joint to shear workpieces, means for guiding the blade holders for movement along parallel paths towards and away from the workpieces, a first ram and cylinder assembly operatively connected between the first crosshead and the first blade holder, a second ram and cylinder assembly operatively connected to the first blade holder, means for supplying pressurized fluid to the second ram and cylinder assembly to drive the first blade holder towards a workpiece, means for automatically sealing the cylinder of the first ram and cylinder assembly when the first blade holder is adjacent a workpiece to trap liquid between the first blade holder and the upper crosshead so as to resist movement of the first blade holder towards the upper crosshead, said sealing means comprising a releasable non-return valve connecting the cylinder to a liquid reservoir, a fluid pressure exerting means independent of the first and second ram and cylinder assemblies carried by said lower crosshead operatively connected to the second blade holder, and means for supplying pressurized fluid to said fluid pressure exerting means to drive the second blade holder towards a workpiece to effect a shear.

2. A shear according to claim 1 in which said valve includes means for biasing it to a closed position such that the valve will be normally closed until the pressure in said reservoir exceeds the pressure in said cylinder by a predetermined amount, and means for introducing pressurized fluid into the valve to oppose the biasing means.

3. A shear according to claim 1 in which the liquid reservoir is a water reservoir at atmospheric pressure.

4. A shear according to claim 1 in which the first blade holder is secured to the piston and the reservoir is mounted on top of the cylinder, and communicates with the cylinder by an opening controlled by the valve.

5. A shear according to claim 1 in which the cylinder has a bleed opening permitting discharge of liquid while the liquid is under pressure during the shearing operation.

6. A shear according to claim 1 in which the fluid pressure exerting means comprising a plurality of ram and cylinder assemblies, and including pressure liquid supply means connectable to one or more of the ram and cylinder assemblies at will.

7. A shear comprising independent first and second blade holders having shear blades adapted jointly to shear workpieces, means for guiding the blade holders for movement along parallel paths towards and away from the workpieces, a first ram and cylinder assembly coupled to the first blade holder, a liquid reservoir, a second double-acting ram and cylinder assembly coupled to the first blade holder, means for supplying pressurised fluid to a first side of the ram of the second ram and cylinder assembly to drive the first blade holder towards a workpiece, means for automatically connecting the first ram and cylinder assembly with the liquid reservoir during movement of the first blade holder towards a workpiece such that liquid flows from the reservoir to that cylinder assembly, means for sealing the cylinder of the first ram and cylinder assembly to trap liquid therein when the first blade holder is adjacent a workpiece, fluid pressure exerting means coupled to the second blade holder, means for supplying pressurised fluid to the cylinder of the fluid pressure exerting means, to drive the second blade holder towards a workpiece to effect a shear, means for releasing the sealing means to reconnect the cylinder of the first ram and cylinder assembly to the liquid reservoir after a shear has been effected, and means for supplying pressurised fluid to the second side of the piston of the second ram and cylinder assembly to withdraw the first blade holder.

8. A shear according to claim 7 in which the liquid reservoir is a water reservoir at atmospheric pressure, and the pressurised fluid for the second ram and cylinder assembly and a fluid pressure exerting means is oil.

9. A hydraulic shear comprising a roller table for workpieces to be sheared, an upper blade holder carrying an upper shear blade extending transversely of the roller table and means for guiding the upper blade holder for vertical movement above the roller table, a ram secured to the upper blade holder and slidable vertically in a stationary cylinder, a liquid reservoir carried by the cylinder and communicating with the interior of the cylinder through an opening in the cylinder wall, a releasable non-return valve in the opening, permitting passage of liquid from the reservoir to the cylinder, a power ram and cylinder assembly coupled to the upper blade holder for driving the upper blade holder towards the roller table, a lower blade holder located below the roller table, means for guiding the lower blade holder for vertical movement, a lower shear blade carried by the lower blade holder and extending parallel to the first blade but displaced therefrom in the direction of the roller table, a ram and cylinder assembly operatively secured between the second blade holder and stationary part, means for supplying liquid under pressure to the assembly secured to the second blade holder, and means for releasing the non-return valve to permit flow of liquid from the upper cylinder to the reservoir, after a shearing operation.

10. A hydraulic shear according to claim 9 in which the upper cylinder has a bleed opening permitting limited discharge of liquid from the cylinder when that liquid is under pressure.

References Cited by the Examiner
UNITED STATES PATENTS

| | | | |
|---|---|---|---|
| 1,734,795 | 11/1929 | Claxton | 91—45 |
| 2,339,024 | 1/1944 | Markson | 91—45 |
| 2,467,546 | 4/1949 | Anderson | 91—44 |
| 2,825,405 | 3/1958 | Maass | 83—623 |
| 2,946,313 | 7/1960 | Powers | 91—45 |
| 3,066,566 | 12/1962 | Bottenhorn | 83—623 |
| 3,137,191 | 6/1964 | O'Brien | 83—623 |

FOREIGN PATENTS 890,242  2/1962  Great Britain.

WILLIAM W. DYER, JR., *Primary Examiner.*

ANDREW R. JUHASZ, *Examiner.*